Jan. 22, 1924.
G. W. CREECH
TROLLEY WIRE GUARD
Filed June 26, 1923
1,481,693
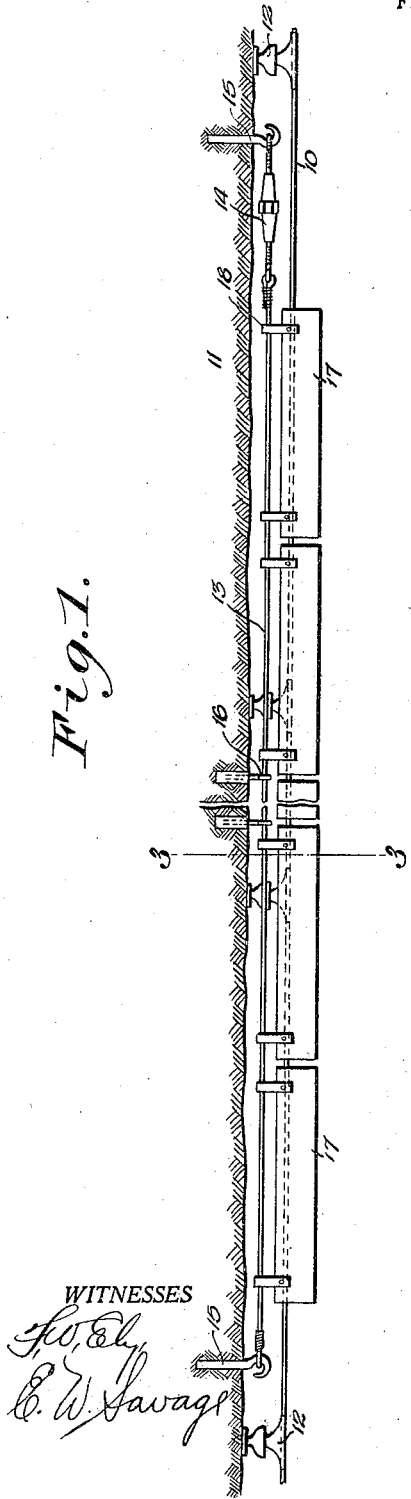
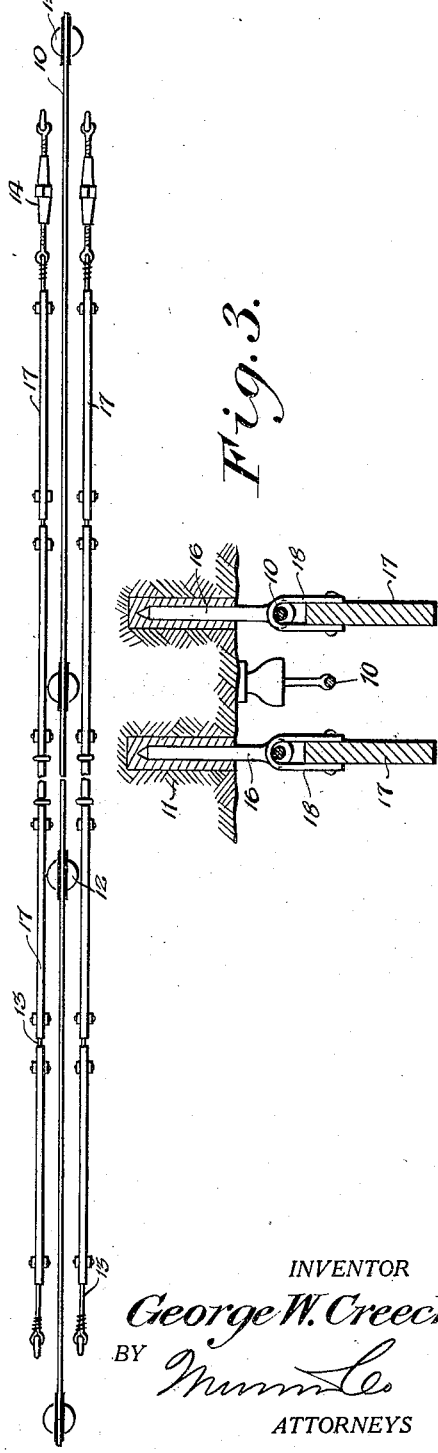
INVENTOR
George W. Creech.
BY
ATTORNEYS Patented Jan. 22, 1924.

1,481,693

UNITED STATES PATENT OFFICE.

GEORGE W. CREECH, OF TWILA, KENTUCKY.

TROLLEY-WIRE GUARD.

Application filed June 26, 1923. Serial No. 647,860.

*To all whom it may concern:*

Be it known that I, GEORGE W. CREECH, a citizen of the United States, and a resident of Twila, in the county of Harlan and State of Kentucky, have invented new and useful Improvements in Trolley-Wire Guards, of which the following is a full, clear, and exact description.

This invention relates to trolley wire guards primarily designed for use in protecting trolley wires mounted in mines.

Many disastrous accidents occur through people coming in contact with unprotected trolley wires. Unprotected trolley wires are particularly dangerous in mines where they cannot be suspended high above the roads on which the trolleys operate. It was the need for some means to protect these trolley wires that gave rise to the conception of the inventor to be described in the subsequent paragraphs.

The general object of the invention is the provision of a simply constructed trolley wire guard for mounting in conjunction with trolley wires to eliminate the danger of people working in their vicinity coming in contact with them.

This object is accomplished by mounting, on either side of the trolley wire, flexible supporting members, and suspending from said flexible supporting members insulating plates which extend below the wire, said plates being mounted so that they may swing about the flexible supporting members.

This and other objects of the invention will be more clearly understood from the following detailed description and accompanying drawings.

Figure 1 is a side elevation showing the trolley wire guard suspended from an overhead support;

Figure 2 is a bottom plan view of the trolley wire guard;

Figure 3 is a vertical cross section along the line 3—3, Figure 1.

Referring to the above-mentioned drawings, a trolley wire 10 is shown suspended from an overhead support 11 by means of insulating hangers 12. The invention includes a plurality of flexible members 13 each provided with a turnbuckle 14. These flexible members 13 are suspended from the overhead support 11 by attaching their ends to hooks 15 which are fixed in the overhead support. A plurality of eye members 16 are mounted on the overhead support and serve to position the flexible members at approximately the same distance from the trolley wire 10 throughout the whole of their lengths. If the surface of the overhead support is uneven so that the trolley wire 10 is spaced at different distances from the surface then the hooks 15 and eyes 16 might be varied in length so as to properly position the flexible supporting members 13 relative to the trolley wire 10.

In mounting the flexible supporting members 13 the hooks 15 and eye members 16 are positioned in the overhead support 11 and located along the trolley wire 10. A flexible member 13 is mounted between each pair of hooks 15. In mounting a flexible member 13 one end is connected to a hook 15 and the other end is threaded through the eye member 16. The free end is then connected to a turnbuckle 14 mounted on the other hook 15 of the pair. The turnbuckle is then operated, tensioning the flexible member, properly positioning it relative to the trolley wire 10. By means of the eye members the flexible members 13 may be mounted to conform to any turn or bend in the trolley wire.

A plurality of insulating plates 17 are suspended from the flexible members 13 by means of U-shaped straps 18. These straps permit the insulating plates 17 to swing about the flexible supporting members 13. The plates are suspended low enough so that when they swing about the flexible supporting members 13 toward the trolley wire they will engage the same, serving to prevent any one from coming in contact with the trolley wire.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A trolley wire guard, comprising a flexible support, means for suspending said flexible support along the trolley wire, means provided in conjunction with said flexible support for tensioning it, and insulating plates suspended from the flexible support.

2. A guard for a trolley wire suspended from an overhead support, comprising flexible members, means for suspending said flexible members from said overhead support along the trolley wire, means provided in conjunction with each flexible member for tensioning it, insulating plates, and means for suspending said insulating plates from the flexible supports so that the insulating plates may swing about the supports.

3. A trolley wire guard, comprising supporting members for mounting on each side of the trolley wire, means provided in conjunction with each flexible member for tensioning it, means for positioning said flexible members along the trolley wire, insulating plates for suspending on both sides of the trolley wire, and means for suspending said insulating plates from said flexible members so that the insulating plates may swing about the flexible members.

4. A guard for electric conductors suspended from overhead supports, comprising flexible members, a plurality of hangers for suspending the flexible members from the overhead supports and evenly spacing them from the conductors, and insulating plates loosely suspended from the flexible members so that they may swing about the latter.

GEO. W. CREECH.